(12) United States Patent
Hamilton

(10) Patent No.: US 12,426,531 B2
(45) Date of Patent: Sep. 30, 2025

(54) CENTRAL FILLING SYSTEM AND METHOD FOR AN AGRICULTURAL APPLICATION IMPLEMENT

(71) Applicant: AGCO Corporation, Duluth, GA (US)

(72) Inventor: Kevin J. Hamilton, Newton, KS (US)

(73) Assignee: AGCO Corporation, Duluth, GA (US)

( * ) Notice: Subject to any disclaimer, the term of this patent is extended or adjusted under 35 U.S.C. 154(b) by 878 days.

(21) Appl. No.: 17/641,053

(22) PCT Filed: Aug. 17, 2020

(86) PCT No.: PCT/IB2020/057721
§ 371 (c)(1),
(2) Date: Mar. 7, 2022

(87) PCT Pub. No.: WO2021/044243
PCT Pub. Date: Mar. 11, 2021

(65) Prior Publication Data
US 2022/0322600 A1 Oct. 13, 2022

Related U.S. Application Data

(60) Provisional application No. 62/896,413, filed on Sep. 5, 2019.

(51) Int. Cl.
*A01C 7/08* (2006.01)
*A01C 7/10* (2006.01)

(52) U.S. Cl.
CPC .............. *A01C 7/081* (2013.01); *A01C 7/105* (2013.01)

(58) Field of Classification Search
CPC ......... A01C 7/081; A01C 7/082; A01C 7/084; A01C 7/105
See application file for complete search history.

(56) References Cited

U.S. PATENT DOCUMENTS

| | | | | |
|---|---|---|---|---|
| 4,100,538 A | * | 7/1978 | Knepler | G01F 23/2921 340/684 |
| 4,491,246 A | | 1/1985 | Dooley | |
| 5,915,313 A | * | 6/1999 | Bender | A01C 21/005 111/178 |
| 6,047,652 A | | 4/2000 | Prairie et al. | |
| 7,430,972 B2 | * | 10/2008 | Audette | A01C 7/081 111/900 |
| 8,350,689 B2 | * | 1/2013 | Mariman | A01C 7/082 340/451 |
| 9,119,338 B2 | * | 9/2015 | Alsater | A01C 7/00 |

(Continued)

FOREIGN PATENT DOCUMENTS

| | | |
|---|---|---|
| EP | 1886548 A2 | 2/2008 |
| GB | 2302075 A | 1/1997 |
| WO | 2017/011355 A1 | 1/2017 |

OTHER PUBLICATIONS

UK Intellectual Property Office, Search report for related UK Application No. GB 1913468.3, dated Mar. 5, 2020.

*Primary Examiner* — Alicia Torres

(57) ABSTRACT

A seed filling system is mounted to a trailing implement that is towed by an agricultural machine. The seed filling system has a reduced-volume receptacle for receiving seed and a metering assembly that causes the distribution of the seed through a manifold to respective storage containers of plural row units before the seed is dispensed to soil.

19 Claims, 7 Drawing Sheets

(56) References Cited

U.S. PATENT DOCUMENTS

| | | | |
|---|---|---|---|
| 9,237,687 B2* | 1/2016 | Sauder | A01C 7/046 |
| 2003/0177970 A1* | 9/2003 | Lee | A01C 7/081 |
| | | | 111/200 |
| 2005/0028714 A1 | 2/2005 | Hagen et al. | |
| 2006/0243179 A1 | 11/2006 | Landphair et al. | |
| 2010/0122646 A1 | 5/2010 | Memory | |
| 2016/0120100 A1 | 5/2016 | Thompson et al. | |
| 2016/0143212 A1 | 5/2016 | Wendte et al. | |
| 2017/0000005 A1 | 1/2017 | Totten et al. | |

* cited by examiner

CENTRAL FILLING SYSTEM AND METHOD FOR AN AGRICULTURAL APPLICATION IMPLEMENT

CROSS-REFERENCE TO RELATED APPLICATION

This application claims the benefit of the filing date of U.S. Provisional Patent Application 62/896,413, "A central fill alternative," filed Sep. 5, 2019, the entire disclosure of which is incorporated herein by reference.

FIELD

The present disclosure is generally related to trailing implements for dispensing of seed.

BACKGROUND

Trailing implements are used in the agricultural industry for, among other purposes, dispensing of seed to soil. One particular design makes use of a central fill system, which includes large-capacity storage located centrally and rearwardly to the implement from which seed is drawn and distributed to plural row units for the dispensing of the seed to the soil. Existing central fill systems offer an improvement over traditional row unit seed boxes in terms of productivity by offering a time savings when refilling the seed. For instance, central fill systems ease swapping out different types of seed and clean out. However, central fill systems also require increased oil consumption, increased hydraulic heat rejection via a tractor cooling system, and may be the basis for poor weight distribution. For instance, the load of the centrally located storage may cause excessive compaction underneath the wheels of the implement, which may reduce product yield by restricting root growth and/or limiting water and/or air infiltration. Some approaches have been implemented to provide for improved weight transfer, including the use of complex hydraulic systems and/or addition of loads to the implement frame to balance weight transfer, though these measures may increase cost, complexity, and/or hydraulic requirements.

BRIEF SUMMARY

In one embodiment, a seed filling system is disclosed that is mounted to a trailing implement that is towed by an agricultural machine, the seed filling system comprising a reduced-volume receptacle for receiving seed and a metering assembly that causes the distribution of the seed through a manifold to respective storage containers of plural row units before the seed is dispensed to soil.

These and other aspects of the invention will be apparent from and elucidated with reference to the embodiment(s) described hereinafter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
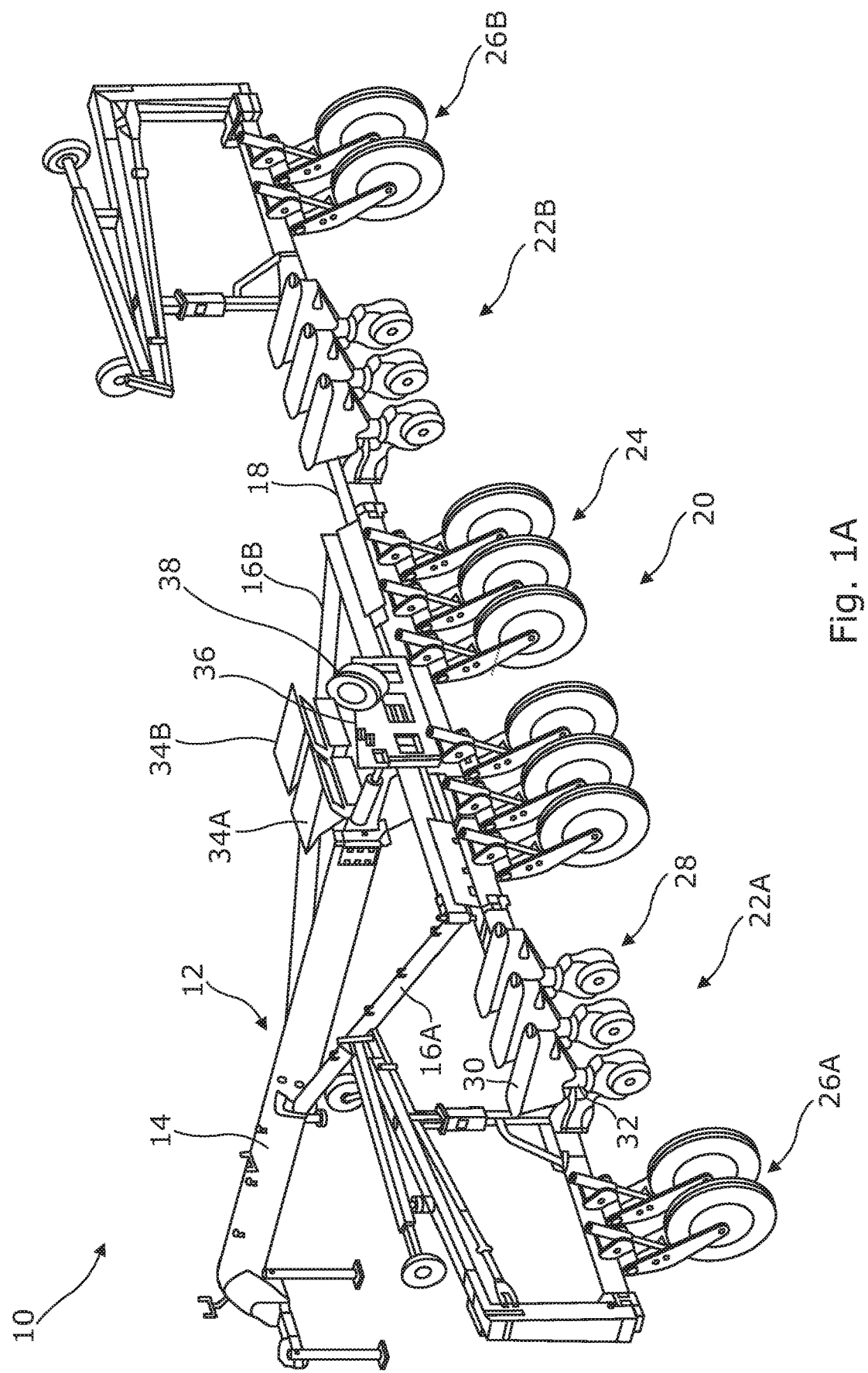
FIG. 1A is a schematic diagram that illustrates, in rear isometric view, an example implement in which an embodiment of a seed filling system is implemented.

Certain embodiments of a seed filling system and method are disclosed that replace central fill systems that have a large, centrally-disposed storage volume using one or more hoppers with a reduced-volume central receptacle for receiving seed and distributed seed storage associated with respective row units to reduce the central load of a trailing implement. In one embodiment, the seed filling system comprises one or more reduced-volume receptacles, a manifold in fluid communication (e.g., for air to flow) with the receptacle and configured to receive seed from the receptacle, plural row units distributed along a laterally-extending frame, each of the row units comprising a storage container and seed dispensing assembly, and a metering assembly configured to cause a distribution of the seed (e.g., through the influence of air flow) from the manifold to the storage containers of the plural row units prior to the seed dispensing assembly dispensing the seed.

Digressing briefly, trailing implements for dispensing seed use a centrally-disposed, large volume hopper(s) that are drawn on to feed plural row units as the seed dispensing assemblies of the row units dispense seed. Though central fill designs such as these have many benefits, their design also tends to impose high central loads that may result in excessive compaction. Central fill systems also require high capacity hydraulics (e.g., to distribute and dispense the seed concurrently), and approaches to balance the loads more evenly have required higher costs and/or complexity to the central fill system. In contrast, certain embodiments of a seed filling system distribute the seed load along the laterally-extending frame of the implement using respective storage of the row units, where the receptacle is merely used as a conduit of the seed to the storage containers before the seed is dispensed to the soil from the row units. For instance, there is never an instance where the full seed capacity required for operations is ever located centrally, since seed distribution to the row units commences during seed fill at the receptacle. Through this approach, loads are reduced centrally to the implement, and in fact, balanced along the implement laterally-extending frame, without the need for additional and/or complex hydraulic systems and/or weights, providing for a cost-effective design that mitigates centrally-located soil compaction while maintaining benefits of a central fill.

Having summarized certain features of a seed filling system of the present disclosure, reference will now be made in detail to the description of a seed filling system as illustrated in the drawings. While a seed filling system will be described in connection with these drawings, there is no intent to limit it to the embodiment or embodiments disclosed herein. For instance, though the description and associated figures illustrate row unit-mounted storage containers, in some embodiments, the storage containers may be frame-mounted in proximity to the row unit. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications, and equivalents included within the scope of the disclosure as defined by the appended claims. Further, it should be appreciated in the context of the present disclosure that the claims are not necessarily limited to the particular embodiments set out in the description.

Note also that references hereinafter made to certain directions, such as, for example, "front," "rear," "left," and "right," are made as viewed from the rear of the implement looking forward.

Figure 1B:
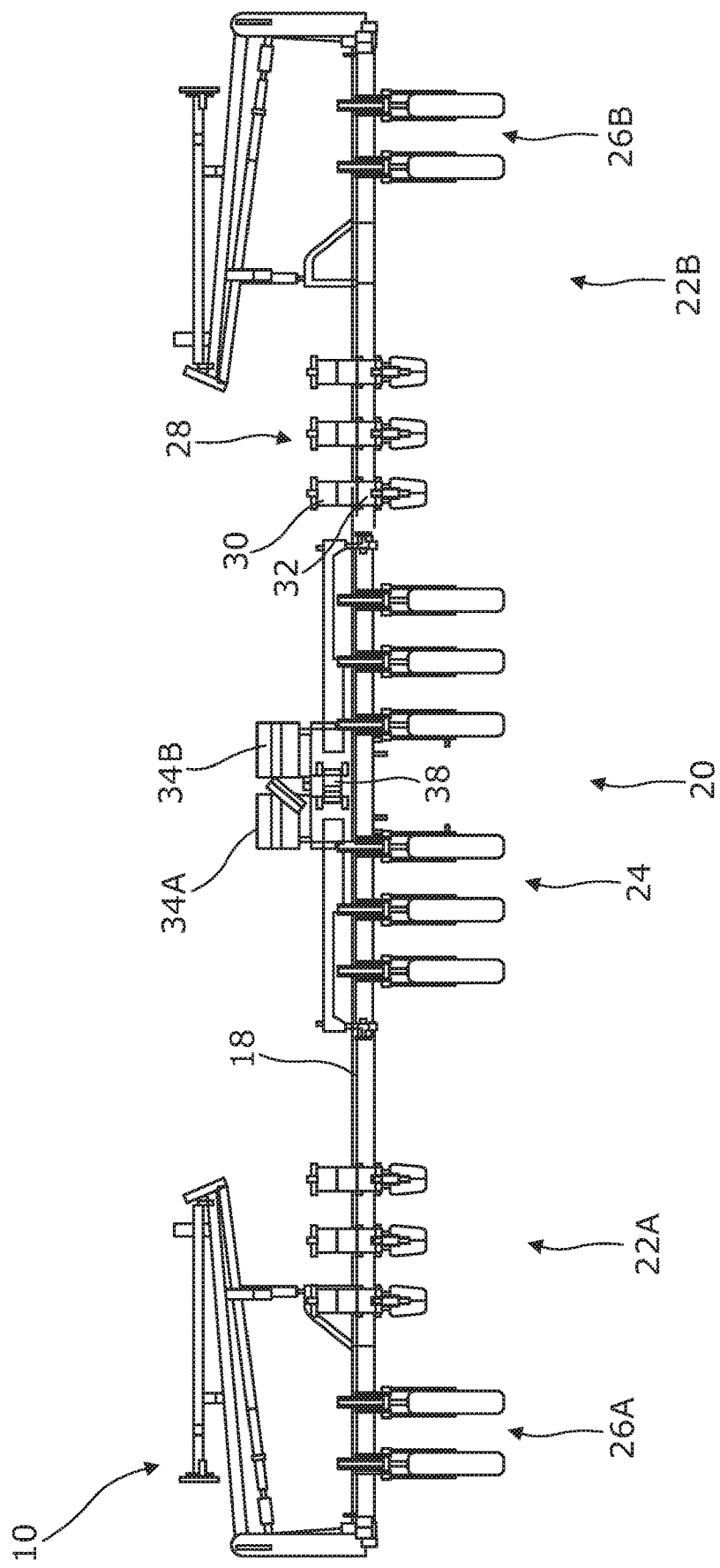
FIG. 1B is a schematic diagram that illustrates, in rear elevation view, the implement depicted in FIG. 1A.

FIGS. 1A-1B comprise schematic diagrams that illustrate an example trailing agricultural application implement 10 in which an embodiment of a seed filling system is implemented. The implement 10 may be towed by an agricultural machine, including a tractor, combine, or other vehicle. The implement 10 comprises a frame 12 having a fore and aft towing bar 14 and support framing 16A, 16B that angle away from the towing bar 14. The implement 10 further comprises a laterally-extending frame 18 that couples to the towing bar 14 and support framing 16. The frame 18 comprises a center portion 20 and outer portions 22A, 22B. The center portion 20 and outer portions 22 are supported respectively by wheel sets 24 and 26A, 26B. It should be appreciated by one having ordinary skill in the art that the quantity and/or arrangement of wheel sets 24 and 26 is illustrative of one example, and that other quantities and/or different arrangements (e.g., in amount of wheels per set or location along the frame 18) may be used in some embodiments. The frame 18 is depicted as foldable at the ends, though in some embodiments, may not have this feature. The implement 10 further comprises plural row units 28 distributed along the frame 18. In this example, there are a total of six (6) row units 28 coupled to the frame 18 along the outer portions 22 (e.g., three (3) along the outer portion 22A, and three (3) along the outer portion 22B). In some embodiments, additional row units 28 arranged along the frame 18 may be used in some embodiments, or fewer in some embodiments. Each row unit 28 comprises a storage container 30 and a seed dispensing assembly 32.

The implement 10 further comprises a seed filling system comprising a one or more receptacles 34 (two shown, 34A, 34B, but quantities may be fewer or greater in some embodiments), a manifold 36, and a metering assembly 38. The seed filling system may comprise fewer or additional components in some embodiments. The receptacles 34 and manifold 36 are mounted to the towing bar 14, the laterally-extending frame 18, or mounted to both the towing bar 14 and the laterally-extending frame 18. The receptacle 34 is configured to receive seed (e.g., from a tender with an auger or conveyer that pulls up to the implement 10 and unloads the seed before seeding operations begin). The receptacle may have a lid that is configured to be removed or generally adjustable to enable switching between open and closed (e.g., hinged opening, sliding opening, etc.). For instance, a lid may be used to prevent ingress of non-seed material (e.g., debris) into the receptacle during field operations, and/or to provide protection from environmental elements. The receptacle 34 is a low-volume receptacle relative to conventional hoppers that is centrally disposed on the frame. In one embodiment, the receptacle 34A alone, or in combination with another receptacle 34B, comprises a total seed volume that is less than the seed capacity volume of all of the storage containers 30 of the row units 28 combined. For instance, the receptacle 34 merely serves as a conduit that facilitates the deposit of seed to the seed filling system. Though depicted as having a four (4) sided inlet that tapers to an orifice (best shown in FIG. 3), the receptacle 34 may be configured according to other geometries that facilitate the loading of seed into the seed filling system, including being shaped as a funnel, bowl, or other geometries. In some embodiment, there may be no lid associated with the receptacle 34. In some embodiments, the receptacle 34 may comprise one or more sensors disposed within the interior volume, or located proximal to the receptacle 34.

The one or more sensors may include load sensors, capacitive sensors, strain gauges, optical sensors, acoustic sensors, among others. In one embodiment, the one or more sensors are configured to sense when seed is present within the receptacle 34 and/or when the seed is discharged proximal to the receptacle 34. In some embodiments, the one or more sensors may sense when a tender is located proximally to the receptacle 34 (e.g., to commence unloading of seed to the receptacle 34). For instance, an optical sensor (e.g., lidar) may be used to detect when an object is approaching an opening of the receptacle 34 and/or wireless communication functionality in devices on the implement 10 and the tender (e.g., Zigbee, near field communications, Blue tooth) enable detection of each unit. The one or more sensors may in turn signal to a controller (or user interface) that the seed is being deposited, or is within the receptacle 34, which in turn prompts the controller (or operator) to engage or turn on the metering assembly 38. As described further below, the seed falls (e.g., by gravity) to the manifold 36, and in one embodiment of operations, the metering assembly 38, which comprises a blower and hydraulic motor, is activated or engaged (e.g., via a clutching mechanism). Upon engagement/activation, the metering assembly 38 causes the distribution of the seed that has entered the manifold 36, for instance by pushing (or pulling in some embodiments) air through the manifold 36 and encountering the seed that has reached the manifold 36 while seed is continually (or periodically, such as in delayed batches) being received at the receptacle 34. The flow of air carries the seed through plural outlets/ports of the manifold 36. In one embodiment, the outlets are coupled to conduit (e.g., hoses, tubing) that is coupled between the outlets and input ports to the storage containers 30 of each of the row units 28. When the amount of seed in each of the storage containers 30 has reached a predetermined seed volume (e.g., maximum seed capacity or some predetermined value less than seed capacity), the metering assembly 38 disengages or deactivates. Subsequently, seed dispensing operations may begin.

Figure 2:
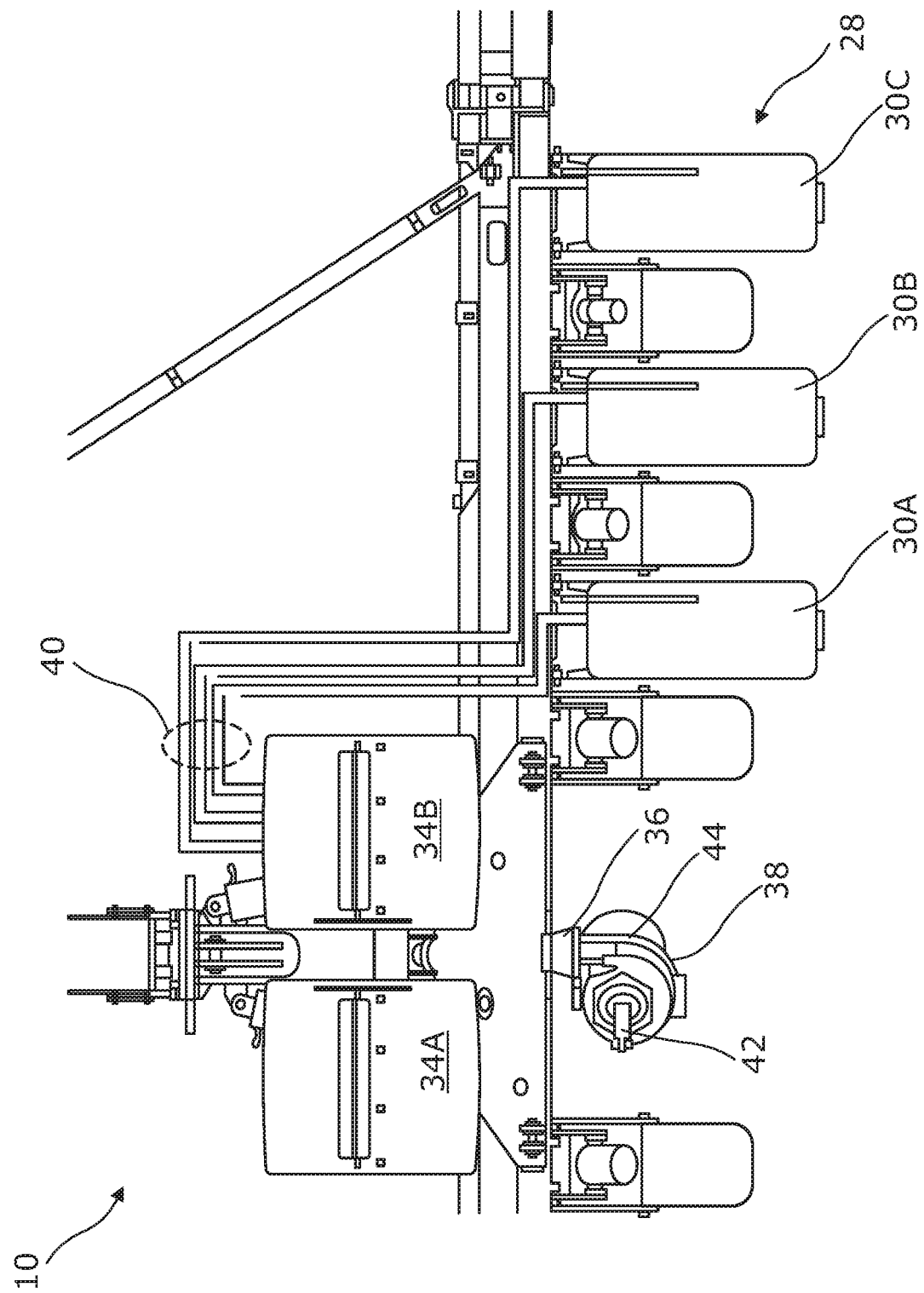
FIG. 2 is a schematic diagram that illustrates, in fragmentary, overhead plan view, an example flow path for seed between a receptacle and storage containers of plural row units of an embodiment of a seed filling system.

Referring now to FIG. 2, shown, in overhead plan view, are select portions of a seed filling system of the implement 10 of FIGS. 1A-1B, including the receptacles 34A, 34B mounted on the implement 10, a portion of the manifold 36, the metering assembly 38, and the storage containers 30 (e.g., 30A, 30B, and 30C). Also shown is conduit 40 (e.g., hosing, tubing, etc.) that is coupled, individually, between the manifold 36 (e.g., to plural outlets or ports of the manifold 36) and inlets of the respective storage containers 30 (e.g., 30A, 30B, and 30C) of the associated row units 28. Notably, the storage containers 30 are not in fluid communication with each other, but rather, air and seed flow through individual outlets of the manifold 36 and respective tubing or hoses that couple to the respective storage container 30, which may facilitate a scaling in design and/or row unit operations. Note that the connections between the manifold 36 and the storage containers 30 are depicted, with connections between the manifold 36 disposed beneath the receptacle 34A and the left hand side storage containers 30 of the row units 28 omitted here for clarity and convenience in illustration, with the understanding that similar connections and operational mechanisms are applicable. In one embodiment, the metering assembly 38 comprises a hydraulic motor 42 and a blower 44 operably coupled to the hydraulic motor 42. In some embodiments, the metering assembly 38 may comprise an electromagnetic assembly. The blower 44 is powered by the hydraulic motor 42, which in some embodiments may be powered by a power assembly in the towing machine (e.g., PTO). The blower 44 forces air through the manifold 36 to cause the distribution of seed received from the receptacle 34 through the respective conduit 40 to the respective storage container 30. Though described in association with positive air pressure, in some embodiments, the blower 44 may be configured to draw air (e.g., as a vacuum) to cause air to flow. As explained above, seed is received at the receptacle 34B, and falls via gravity feed to the manifold 36, which is in fluid communication with the receptacle 34B. In one embodiment, as the seed is received at the receptacle 34B, the air flow caused by the metering assembly 38 carries the seed that has migrated to the manifold 36 through outlets of the manifold 36, which are in fluid communication with the storage containers 30 via the conduit 40 (e.g., respective hoses). The seed is carried through outlets of the manifold 36, through the conduit 40, and to the inlets of the storage containers 30 before the seed dispensing assembly 32 (FIG. 1A) dispenses the seed to the soil. Though shown using a single set for the metering assembly 38 (e.g., one blower 44, one hydraulic motor 42), plural sets may be used in some embodiments.

Figure 3:
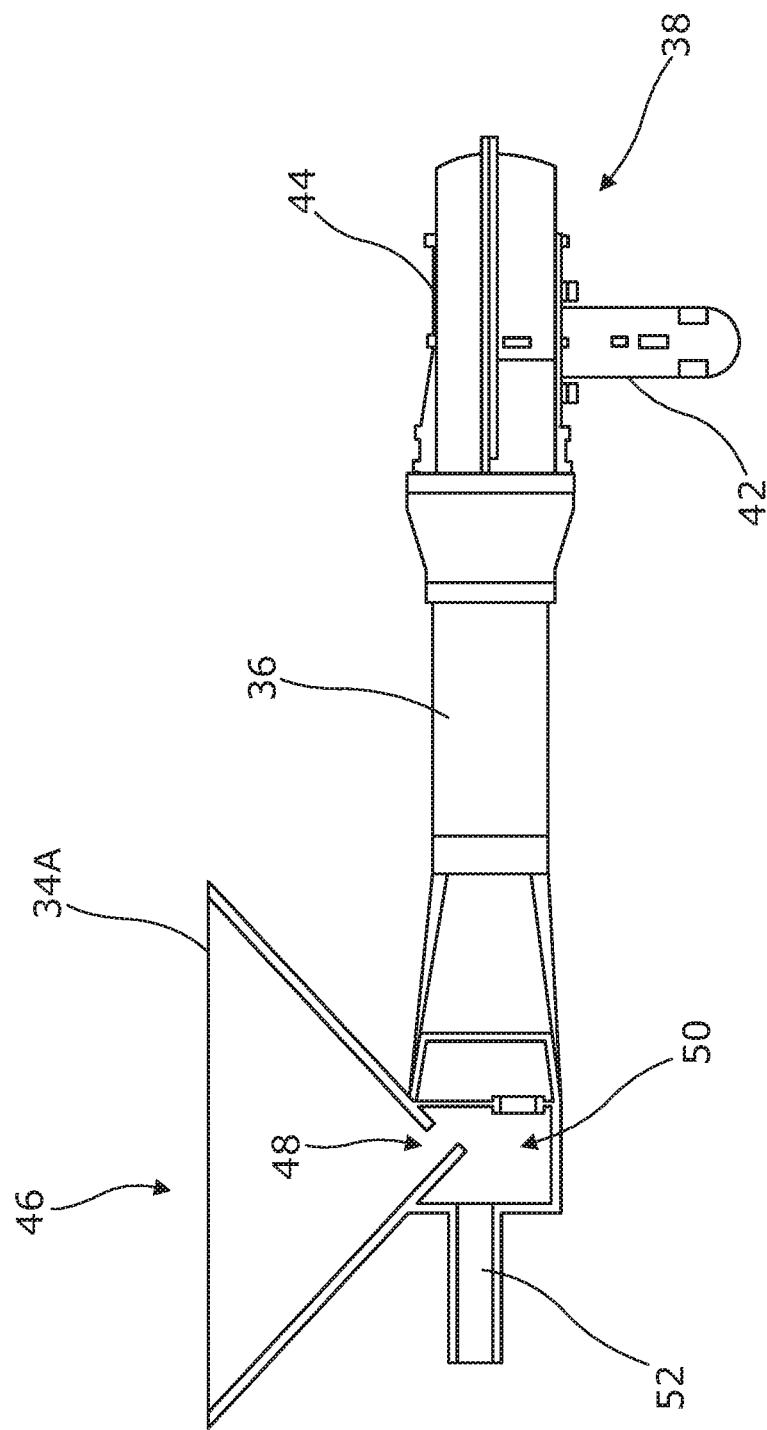
FIG. 3 is a schematic diagram that illustrates, in side elevation view, an arrangement of a receptacle, manifold, and metering assembly of an embodiment of a seed filling system.

FIG. 3 is a schematic diagram that illustrates an example arrangement of the receptacle 34A, the manifold 36, and the metering assembly 38 comprising the blower 44 and the hydraulic motor 42 operably coupled to the blower 44. The receptacle 34A, the manifold 36, and the metering assembly 38 are in fluid communication with each other, enabling the flow of air from the metering assembly 38 through the manifold 36, and enabling seed flow from the receptacle 34A to the manifold 36. In the depicted example, the receptacle 34A is configured with a seed volumetric space that tapers from a large area inlet 46 (e.g., top-side) to a smaller area outlet 48. The outlet 48 of the receptacle 34A empties into a chamber 50, where the seed that is emptied into the receptacle 34A falls via gravity feed. The air flow caused by the blower 44 passes through the manifold 36 and into the chamber 50, where the pressurized air encounters the seed. The seed is carried out of the chamber 50 and through an outlet 52, which is coupled to a conduit 40. Note that there are plural outlets 52 of the manifold 36 (and corresponding conduit connections), though obscured in this view. The outlets 52 may comprise a baffle arrangement that distributes the seed and air to the individual outlets 52. The design illustrated in FIG. 3 depicts one example, and that in some embodiments, other designs may be used to receive seed and distribute the seed to the storage containers 30 of the row units 28 (FIG. 2).

Figure 4B:
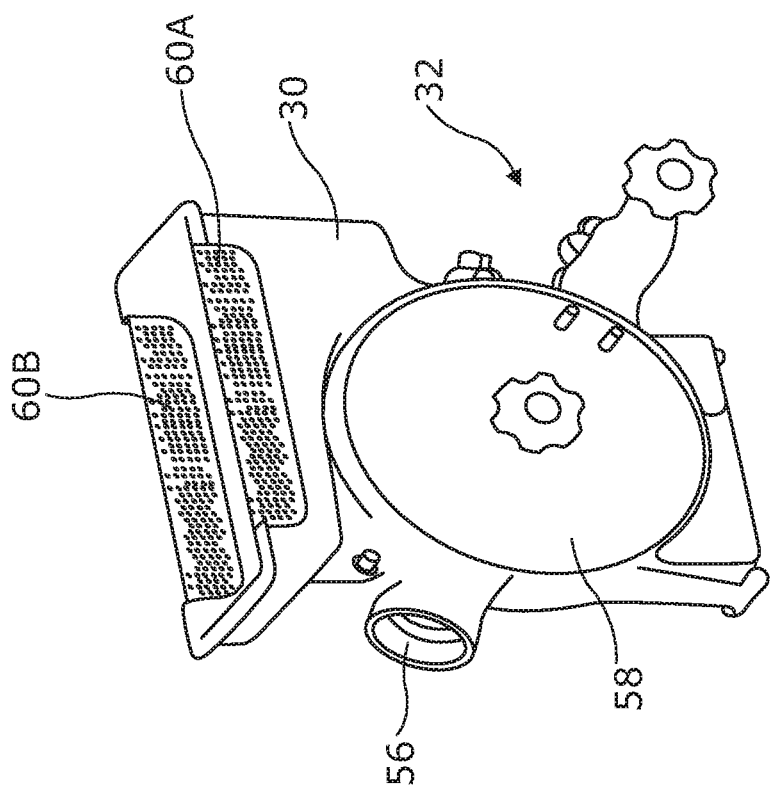
FIGS. 4A-4B are schematic diagrams that illustrate an example storage container and a portion of a seed dispensing assembly of an embodiment of a seed filling system.
Figure 4A:
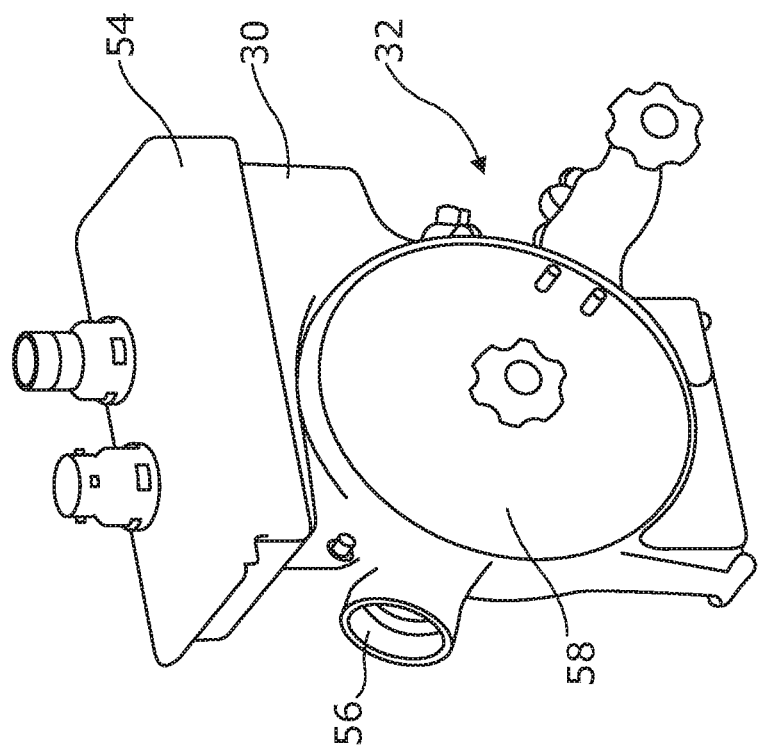

Attention is now directed to FIGS. 4A-4B, which illustrate the storage container 30 and portions of the seed dispensing assembly 32 of the row unit 28. It should be appreciated that the row unit 28 comprises other features, including gauges wheels, closing wheels, a seed clip/tube for dispensing the seed, among other features known to those having ordinary skill in the art. An example row unit includes the AGCO 9000 Series of White planters as one illustrative example, though other row unit designs from the same or other manufacturers may be used. FIG. 4A depicts the storage container 30 comprising a lid, with an inlet 56 for coupling to the conduit 40 (FIG. 2) and receiving the seed. The seed dispensing assembly 32 includes a seed meter 58 for drawing seeds from the storage container 30, the seed meter 58 dispensing the seed through a seed clip/tube (not shown) that dispenses the seed adjacent to inner portions of the gauge wheels of the row unit 28 as is known. Though not shown, the seed meter 58 works in conjunction with a meter blower that is proximal to the row unit 28, which are shut off or disengaged during seed filling to the storage containers 30 (and hence seed filling/seed distribution from the receptacle 34 and manifold 36), and engaged or turned on during seed dispensing from the row unit 28. Accordingly, one benefit to certain embodiments of a seed filling system is the reduced hydraulic requirements during operations, since hydraulic requirements are based on separate and independent stages (e.g., initial seed fill/distribution that uses the metering assembly 38 and not the seed metering blower followed by seed dispensing that uses the seed metering blower but not the metering assembly 38).

FIG. 4B illustrates the storage container 30 with the lid 54 removed, revealing a vent or vents 60A, 60B adjacent the top portion of the storage container 30. The seed is distributed to the storage containers 30 in one embodiment until the vent(s) 60 are closed by the accumulated seed, which prevents further ingress to the storage container 30. The point where no flow can occur through the vent(s) 60 due to the accumulation of seed is one example of a predetermined seed volume, which in this example, represents the seed volume capacity of the storage container 30. In some embodiments, the vent(s) 60 may have a mechanism that is manually adjusted to block upper portions of the vent(s) 60 to enable a predetermined seed volume that is less than (maximum) capacity. In some embodiments, one or more sensors may be used to detect that a predetermined seed volume has been reached, whether the predetermined seed volume is at capacity of the storage container 30 or less than (maximum) capacity. The sensors may be disposed within the storage container 30 (e.g., configured as load sensors or capacitive-based sensors) in some embodiments, or located proximal to the storage container 30 (e.g., and detect whether the predetermined seed volume has been reached via optical or acoustic sensors). In some embodiments, the sensors may be disposed in the conduit 40 or at the manifold outlets 52. Regardless of the location of the sensors, such sensors may be used in addition to, or in lieu of, the vents 60.

Figure 5:
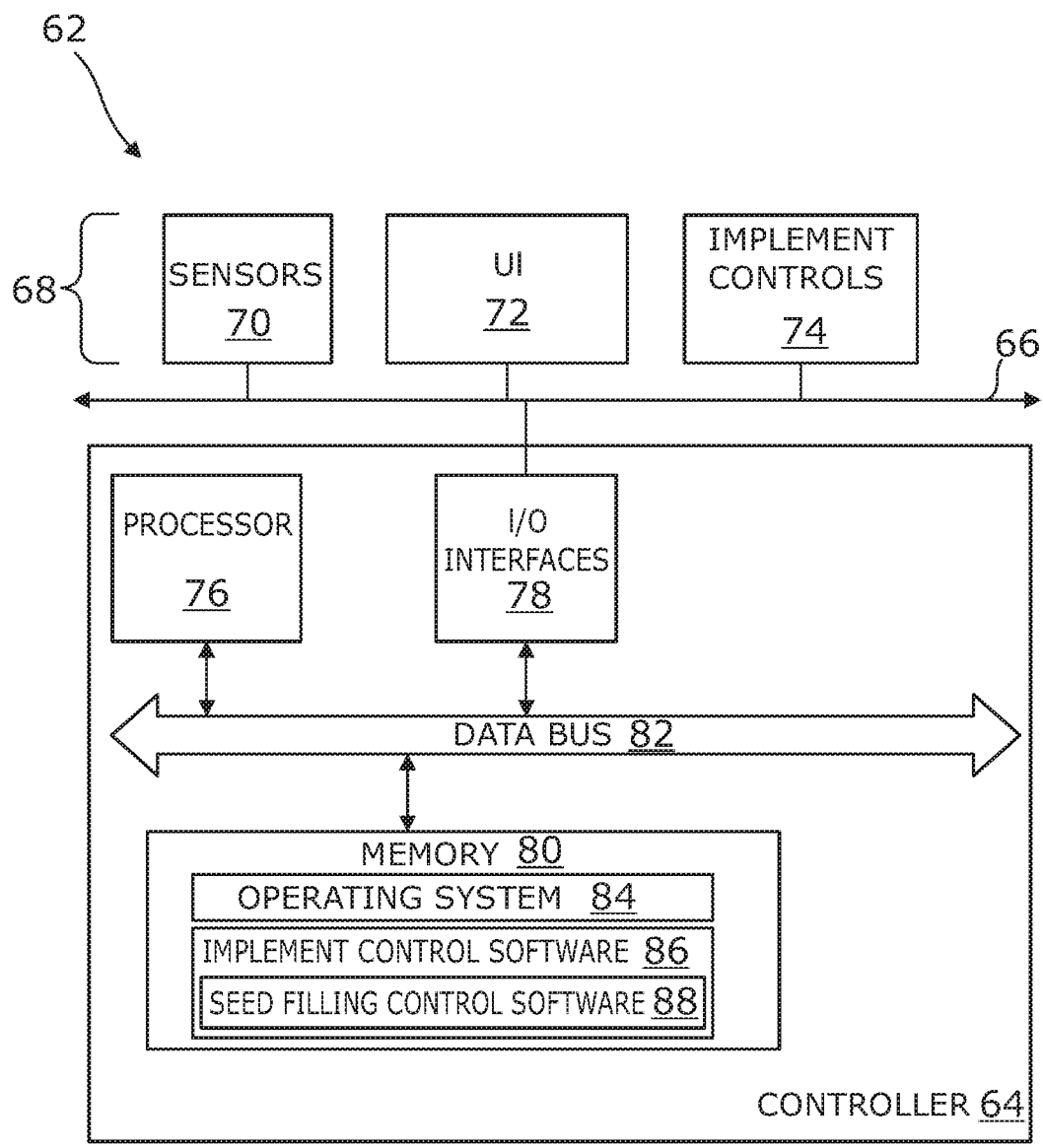
FIG. 5 is a block diagram that illustrates an example control system of an embodiment of a seed filling system.

FIG. 5 is a block diagram that illustrates an example control system 62 of an embodiment of a seed filling system. It should be appreciated by one having ordinary skill in the art, in the context of the present disclosure, that the control system 62 depicted in FIG. 5 is illustrative of one example, and that in some embodiments, fewer or additional components may be used. The control system 62 may be distributed among the implement 10 and a towing machine, or in some embodiments, reside entirely on the implement 10. In some embodiments, the control system 62 may be distributed among the implement 10, a towing machine, and a remote computing device (e.g., using a communications gateway, including a cellular and/or wireless modem), or in some embodiments, be distributed among the implement 10 and a remote computing device. The control system 62 comprises a controller 64 (e.g., electronic control unit or ECU), the controller 64 communicatively coupled via a data bus or data busses 66 (e.g., controller area network (CAN) system) to a sub-system 68 that may include one or more sensors 70, a user interface 72, and implement controls 74, which are further explained below. Though emphasis in this disclosure is on the use of a single controller 64, in some embodiments, functionality of the control system 62 may be achieved through the use of plural controllers operating under distributed, local, or remote control according to a peer-to-peer or master-slave control strategy. For instance, the controller 64 may reside in a towing machine that is towing the implement 10, the controller 64 in communication and cooperation with another controller of similar design located on the implement 10. In some embodiments, the controller 64 may operate without cooperation with another controller, and reside on the towing machine or the implement 10 or remotely (e.g., and in communication with controls on the implement 10 via a cellular and/or wireless connection). One having ordinary skill in the art should appreciate in the context of the present disclosure that the example controller 64 is merely illustrative, and that some embodiments of the controller 64 may comprise fewer or additional components than those described below, and/or some of the functionality associated with the various components depicted in FIG. 5 may be combined, or further distributed among additional modules or devices, in some embodiments. In some embodiments, functionality of modules described herein may be implemented as software, hardware, or a combination of software and hardware. In some embodiments, functionality of the controller 64 may be implemented according to other types of devices, including a programmable logic controller (PLC), FPGA device, ASIC device, among other devices. It should be appreciated that certain well-known components of computer devices are omitted here to avoid obfuscating relevant features of the controller 64.

In one embodiment, the controller 64 comprises one or more processors, such as processor 76, input/output (I/O) interface(s) 78, and memory 80, all coupled to one or more data busses, such as data bus 82. The memory 80 may include any one or a combination of volatile memory elements (e.g., random access memory (RAM, such as DRAM, SRAM, SDRAM, etc.)) and nonvolatile memory elements (e.g., ROM, Flash, solid state, EPROM, EEPROM, etc.). The memory 80 may store a native operating system, one or more native applications, emulation systems, or emulated applications for any of a variety of operating systems and/or emulated hardware platforms, emulated operating systems, etc. In the embodiment depicted in FIG. 5, the memory 80 comprises an operating system 84 and implement control software 86, which in one embodiment comprises seed filling control software 88. It should be appreciated by one having ordinary skill in the art that in some embodiments, additional or fewer software modules (e.g., combined functionality) may be employed in the memory 80 or additional memory. Memory 80 may comprise a non-transitory computer readable storage medium. In some embodiments, a separate storage device(s), which may be configured as a non-transitory computer readable storage medium, may be coupled to the data bus 82 and/or other data bus (busses) 66. In some embodiments, the separate storage device(s) may be configured as persistent memory (e.g., optical, magnetic, and/or semiconductor memory and associated drives).

Referring to the implement control software 86, the implement control software 86 comprises executable code (e.g., instructions) that, when executed by the processor 76, actuates the implement controls 74 to perform functions that include the folding of end portions of the laterally-extending frame 18, raising or lowering of the frame 18, and/or other functions involving operations of the implement 10. In one embodiment, the implement controls 74 comprise one or more actuators (e.g., solenoids) that are coupled to control valves that regulate the flow of hydraulic fluid in hydraulic control circuits that include one or more hydraulic cylinders and/or one of more hydraulic motors. The seed filling control software 88 of the implement control software 86 likewise comprises executable code (e.g., instructions) that enables functionality of certain embodiments of a seed filling system. In one embodiment, the seed filling control software 88 receives input from one or more sensors 70 that detect seed presence within or proximal to the receptacle 34, and based on the sensor signals, triggers the implement controls 74 to engage or activate the metering assembly 38. For instance, the implement controls 74 may comprise a solenoid that is coupled to a valve that, when triggered by a signal from the seed filling control software 88, allows the flow of hydraulic fluid to flow through the hydraulic motor 42. Pressure differentials or porting through various chambers actuates the hydraulic motor 42, which in turn engages or turns on the blower 44. The blower 44 in turn forces air through the manifold 36 and carries the deposited seed for distribution to the storage containers 30 as described above. The blower 44 may shut off when there is no ability of further air flow (e.g., when vents 60 of the respective storage containers 30 have been blocked by the seed). In some embodiments, seed fill may be terminated based on further signaling from the one or more sensors 70. For instance, sensors 70 that detect when the predetermined seed volume has been reached at each of the storage containers 30 may signal to the implement controls 74, which in turn shuts the flow of hydraulic fluid causing the disengagement or shut off of the hydraulic motor 42 and blower 44. As indicated above, the sensors 70 may be located within each of the storage containers 30, proximal to the storage containers 30, in the conduit 40, or at the manifold outlets 52, and may include load sensors, capacitive sensors, optical sensors, acoustic sensors, among other types. The seed filling control software 88 also triggers the seed meter and associated seed meter blower to engage or activate for the dispensing of seed. In one embodiment, an operator enters input at the user interface 72, which is communicated to the seed filling control software 88, which in turn activates a solenoid that causes a hydraulic cylinder to permit the flow of hydraulic fluid through a hydraulic motor of the seed meter blower, which in turn causes the dispensing of seed to the soil. In some embodiments, the seed meter blower may be an electromagnetic device, where the signaling from the seed filling control software 88 may be direct to, for instance, an electromagnetic cylinder, electric motor, or intervening electromagnetic controls that triggers the seed meter and dispensing of seed to the soil from the storage container 30. In some embodiments, the user interface 72 may be the trigger for seed filling/seed distribution operations. For instance, an operator may activate a switch, button, knob, screen, etc. to activate or engage the metering assembly 38 upon observation of seed deposit from a tender. For instance, user input at the user interface 72 may trigger actuation at a solenoid of the implement controls 74, which permits flow to the hydraulic motor 42 and subsequent activation of the blower 44 for commencement of seed distribution operations. The sensors 70 may detect when the storage containers 30 are at a predetermined seed volume, and signal either the seed filling control software 88 or merely trigger an electromagnetic control or light or audible alarm that is part of the user interface 72, which alerts the operator to select a control on the user interface 72 to shut down or disengage the metering assembly 38. In some embodiments, the user interface 72 may comprise controls at the implement 10, within the towing machine, or at both the implement 10 and the towing machine.

The implement control software 86 and the seed filling control software 88 comprise executable code/instructions that, when executed by the processor 76, achieve the aforementioned seed filling, seed distribution, and implement functionality. Execution of the implement control software 86 and the seed filling control software 88 is implemented by the processor 76 under the management and/or control of the operating system 84. In some embodiments, functionality of the implement control software 86 and the seed filling control software 88 may be implemented as hardware (e.g., digital logic gates), or as a combination of hardware and software.

The processor 76 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 64.

When certain embodiments of the controller 64 are implemented at least in part with software (including firmware), as depicted in FIG. 5, it should be noted that the software can be stored on a variety of non-transitory computer-readable storage medium for use by, or in connection with, a variety of computer-related systems or methods. In the context of this document, a computer-readable storage medium may comprise an electronic, magnetic, optical, or other physical device or apparatus that may contain or store a computer program (e.g., executable code or instructions) for use by or in connection with a computer-related system or method. The software may be embedded in a variety of computer-readable storage mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the controller 64 are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The I/O interfaces 78 provide one or more interfaces to the sub-system 68 via the data bus or busses 66, which comprises a wired medium (e.g., CAN system or bus), a wireless medium (e.g., Bluetooth channel(s), near field communications, Zigbee, WiFi, etc.), or a combination of wired and wireless mediums or media. In other words, the I/O interfaces 78 may comprise any number of interfaces for the input and output of signals (e.g., analog or digital data) for conveyance over one or more communication mediums. In the depicted embodiment, the sub-system 68 comprises one or more components that are in communication with the controller 64 via the data bus 66, including the one or more sensors 70, the user interface 72, and/or the implement controls 74. In some embodiments, additional components may be coupled to the data bus 66, including other controllers, other actuators, and/or telephony/radio components (e.g., cellular and/or radio frequency (RF) modem), the latter enabling communications with other networks, systems, or remote devices. In some embodiments, the controller 64 may include a user interface (e.g., coupled to the data bus 82). The user interface 72 may comprise knobs, buttons, switches, a display screen (e.g., including touch-type display), a microphone, a speaker, among other interfaces that enable interaction between an operator and certain embodiments of a seed filling system. Note that in some embodiments, the manner of connections among two or more components may be varied (e.g., with or without intervening components). These and/or other variations are contemplated to be within the scope of the disclosure as would be appreciated by one having ordinary skill in the art.

Figure 6:
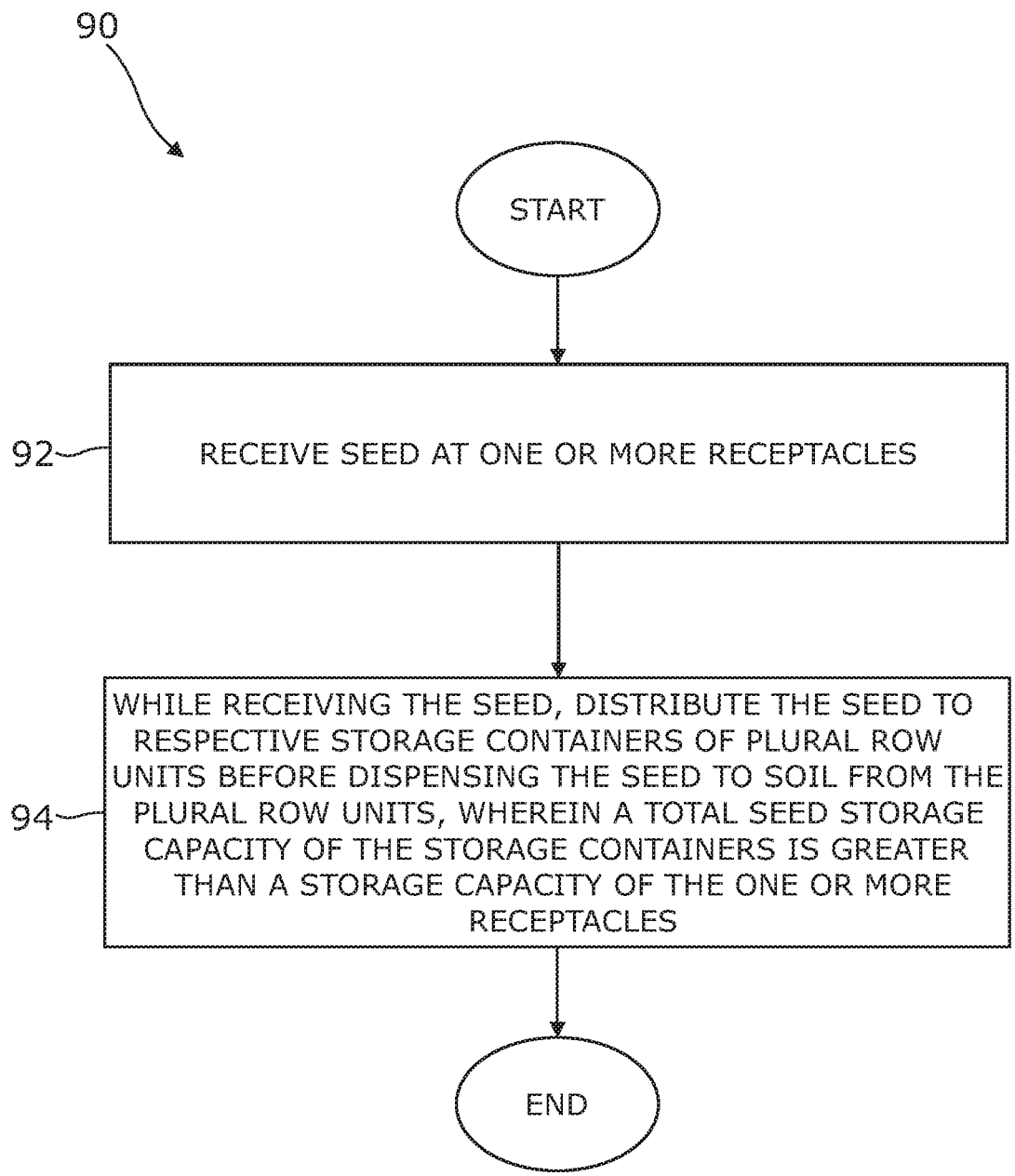
FIG. 6 is a flow diagram that illustrates an embodiment of an example seed filling method.

Having described certain embodiments of a seed filling system, it should be appreciated that one embodiment of a seed filling method for a trailing implement that is towed by an agricultural machine, denoted as method 90 and depicted in the flow diagram of FIG. 6, comprises receiving seed at one or more receptacles (92); and while receiving the seed, distributing the seed to respective storage containers of plural row units before dispensing the seed to soil from the plural row units, wherein a total seed storage capacity of the storage containers is greater than a storage capacity of the one or more receptacles (94).

Any process descriptions or blocks in flow charts should be understood as representing at least in part modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments, but is not necessarily included. Thus, the present technology can include a variety of combinations and/or integrations of the embodiments described herein. Although the control systems and methods have been described with reference to the example embodiments illustrated in the attached drawing figures, it is noted that equivalents may be employed and substitutions made herein without departing from the scope of the disclosure as protected by the following claims.

The invention claimed is:

1. A seed filling system mounted to a trailing implement configured to be towed by an agricultural machine, the seed filling system comprising:
   a receptacle configured to receive seed from a source external to the trailing implement;
   a manifold in fluid communication with the receptacle and configured to receive the seed;
   a plurality of row units in fluid communication with the manifold, each row unit comprising a storage container and a seed dispensing assembly, wherein a total seed storage capacity of the storage containers is greater than a storage capacity of the receptacle; and
   a metering assembly configured to cause a distribution of the seed from the manifold to each of the storage containers prior to the seed dispensing assembly dispensing the seed.

2. The seed filling system of claim 1, further comprising at least one additional receptacle in fluid communication with the manifold.

3. The seed filling system of claim 1, wherein the metering assembly comprises at least one hydraulic motor and at least one blower.

4. The seed filling system of claim 3, wherein the metering assembly is configured to cause the distribution of the seed until a predetermined volume of each of the storage containers is filled with seed.

5. The seed filling system of claim 4, wherein each of the storage containers comprises a vent, wherein the predetermined volume is a volume at which air flow through the vent is stopped, preventing ingress of further seed.

6. The seed filling system of claim 4, further comprising a controller and at least one sensor wherein the at least one sensor is configured to provide an indication of a volume filled with seed compared to the predetermined volume and, based on the indication, the controller is configured to cause the metering assembly to turn off or disengage.

7. The seed filling system of claim 4, further comprising a controller configured to cause the seed dispensing assembly to dispense the seed after the predetermined volume of each of the storage containers is filled with seed.

8. The seed filling system of claim 1, further comprising a controller configured to cause the metering assembly to commence seed distribution operations.

9. The seed filling system of claim 8, further comprising at least one sensor, wherein the controller is configured to cause the metering assembly to commence seed distribution operations based on the at least one sensor detecting a presence of the seed within or proximal to the receptacle.

10. The seed filling system of claim 8, further comprising at least one sensor and a seed tender, wherein the controller is configured to cause the metering assembly to commence seed distribution operations based on the at least one sensor detecting a presence of the seed tender proximal to the receptacle.

11. The seed filling system of claim 8, further comprising a user interface, wherein the controller is configured to cause the metering assembly to commence seed distribution operations responsive to receiving an input at the user interface.

12. A seed filling method for a trailing implement towed by an agricultural machine, the method comprising:
    receiving seed in at least one receptacle from a source external to the trailing implement; and
    while receiving the seed, distributing the seed to respective storage containers of a plurality of row units before dispensing the seed to soil from the row units, wherein a total seed storage capacity of the storage containers is greater than a storage capacity of the at least one receptacle.

13. The seed filling method of claim 12, wherein distributing the seed to respective storage containers comprises driving at least one blower with at least one hydraulic motor to cause air flow to the respective storage containers.

14. The seed filling method of claim 13, further comprising terminating the distributing when a predetermined volume of each of the storage containers is filled with seed.

15. The seed filling method of claim 14, wherein air flow through a vent of each of the storage containers ceases when the predetermined volume is filled with seed.

16. The seed filling method of claim 14, further comprising detecting, using at least one sensor, when the predetermined volume is filled with seed.

17. The seed filling method of claim 14, further comprising dispensing the seed to the soil from the plurality of row units after the predetermined volume of each of the storage containers is filled with seed.

18. The seed filling method of claim 12, further comprising commencing distribution of the seed based on detecting a presence of the seed within or proximal to the at least one receptacle or based on detecting a presence of a seed tender proximal to the at least one receptacle.

19. The seed filling method of claim 12, further comprising commencing distribution of the seed based on receiving input at a user interface.

* * * * *